May 10, 1932.   E. E. HILL   1,857,593
TESTER FOR WATT HOUR METERS AND THE LIKE
Filed Nov. 20, 1930   2 Sheets-Sheet 1
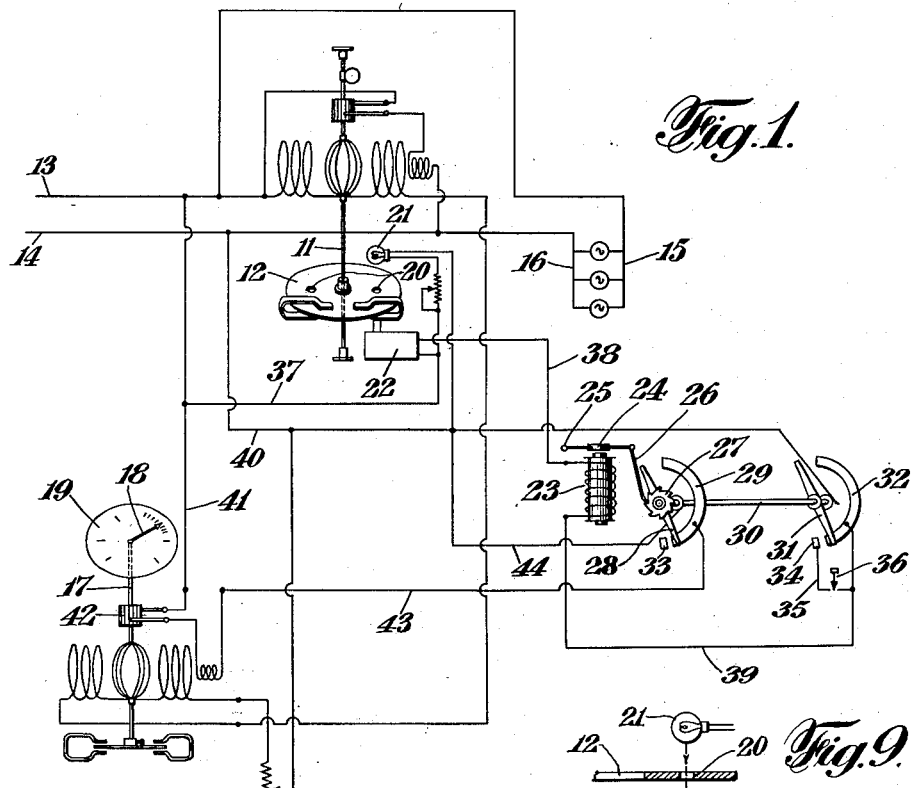
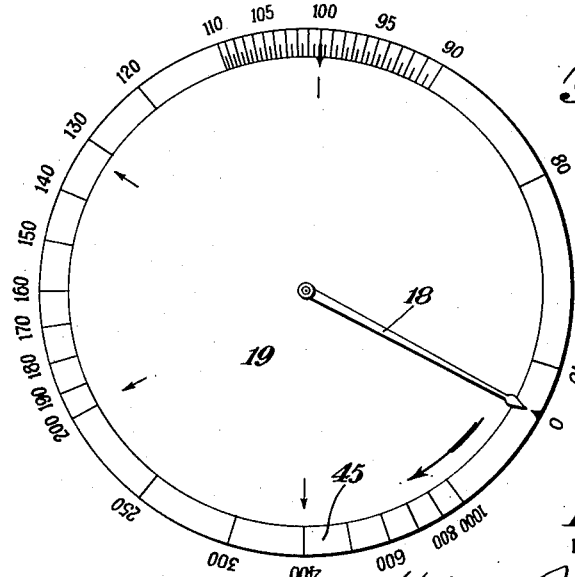
INVENTOR
Edward E. Hill
BY
Usina & Rauber, ATTORNEYS May 10, 1932.  E. E. HILL  1,857,593
TESTER FOR WATT HOUR METERS AND THE LIKE
Filed Nov. 20, 1930  2 Sheets-Sheet 2

INVENTOR
Edward E. Hill
BY
Winart Rauber, ATTORNEYS

Patented May 10, 1932

1,857,593

UNITED STATES PATENT OFFICE

EDWARD E. HILL, OF FOREST HILLS, NEW YORK, ASSIGNOR OF THIRTY PER CENT TO AUGUST F. KOCHENDORFER, OF HOBOKEN, NEW JERSEY, AND THIRTY PER CENT TO LOUIS F. FALKENSTEIN, OF FLUSHING, NEW YORK

TESTER FOR WATT HOUR METERS AND THE LIKE

Application filed November 20, 1930. Serial No. 496,863.

Electric meters and similar apparatus having rotating, oscillating or similarly moving parts have generally to be tested. Watt hour meters, for example, are made fairly cheaply on a production basis and are tested before use and at occasional intervals thereafter by comparison with a standard meter made with great precision.

My invention provides an apparatus for making such tests with speed and accuracy. The apparatus also is designed for various other uses where a test is to be made of the speed of an apparatus which measures current, or other operation, by the oscillation or repeated movement of a part of the apparatus. The part in question may be rotating, oscillating, reciprocating or vibrating, for example.

The accompanying drawings illustrate an embodiment of the invention:—

Fig. 1 is a diagram of a tester for a watt hour meter;

Fig. 2 is an enlarged elevation of the indicating dial;

Fig. 9 is a view similar to Fig. 1, illustrating another variant.

Figure 3:
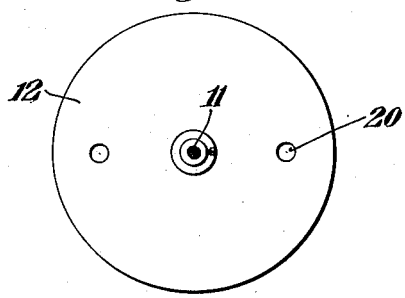
Fig. 3 is a plan of the disc of a watt hour meter.

Referring to Fig. 1, the meter to be tested is illustrated at the top. It is of the usual type with a vertical shaft 11 carrying a disc 12 which is rotated at a speed commensurate with the passing current. The supply wires are indicated at 13 and 14 and the house wires at 15 and 16.

The standard meter below has a vertical shaft 17, the upper end of which is geared to drive the pointer 18 around a dial 19 at a certain reduced rate of speed.

The disc 12 of the house meter has apertures 20 at regular intervals around it. These are provided in order to check the rotation. In the present case I use them for a new purpose. Above the disc and in vertical alignment with the openings 20 as they rotate is a lamp 21. This throws a ray of light through each of the openings as it passes under the lamp. In line with the light ray is a light-activated cell 22 of the selenium or photoelectric type, for example.

The activation of the light cell produces a current flow through a relay 23 (or it may be a combined amplifying device and relay). Such current is intermittent as the openings through the disc pass under the lamp. Above the relay 23 is an armature 24 pivoted at one end 25 and carrying at its moving end a pawl 26 which actuates a ratchet 27 on the shaft of which is a double-ended contact 28 adapted to travel over the face of the fixed contact 29. The contact 29 might be a complete circle, using a single-ended movable contact 28, instead of the half circle using a double-ended contact, as shown. In fact various other styles of contact device can be used. A suitable mechanical motion-transmitting device, indicated at 30, transmits the rotation or motion of the movable contact 28 to a second movable contact 31 traveling over a fixed contact plate 32.

The two movable contacts 28 and 31 are electrically insulated and are only mechanically connected together. At the lower end of each of the fixed contacts 29 and 32 there is a separate small fixed contact, 33 and 34 respectively, separated by an insulating space. The contact 34 leads by a wire 35 through a push button 36 to the circuit of the segment 32 so that when the pointer rests on 34 it will be normally disconnected from the segment 32 but may be connected thereto by pushing the button.

The circuit through the contact 32 is as follows:—From the supply wire 13, by wire 37 to the cell 22, thence by wire 38 to relay 23, thence by wire 39 to the fixed contact 32 and from the shaft of the movable contact 31 by wire 40 to the opposite supply wire 14. The contact 32, therefore, is used to continue or to break the circuit through the light cell and through the relay.

The contact 29 controls the current which is measured by the standard meter. The circuit is as follows:—From the supply wire 13 through wire 41 to the commutator 42 of the standard meter, thence by wire 43 to the fixed contact 29, thence from the shaft of the movable contact 28 through wires 44 and 40 to the opposite supply wire 14.

As long as the contact is maintained through the first circuit, the light cell and the relay will operate and the latter will continue to advance the movable contact 28 step by step over the contact 29 to continue the current through the standard meter and to move the pointer 18 thereof around the dial. When the movable contacts 31 and 28 strike the insulated part of the segment, the circuits through both these devices will be broken and the pointer of the standard meter will come to rest. The number which it registers on the dial will give a measure of the number of rotations of the disc 12 and the number of watt hours registered on the standard meter.

Referring to Fig. 2, the pointer 18 of the standard meter moves over a scale 45 which instead of merely showing a number of equal steps, is graduated to indicate the percentage of accuracy corresponding thereto. For example, assuming the indicator connected by a three-to-one gear with the shaft of the standard meter, then two revolutions of the shaft will carry the pointer two-thirds of the way around the dial to the graduation which indicates 100%.

If during the period in question the pointer passes beyond the 100% mark, then the standard meter has indicated, during the passage of the current for a certain time, more watt hours than the other. This means that the meter under test is too slow. The actual number of watt hours of current consumed is greater than the advance of the meter under test. The percentage of accuracy diminishes in proportion as it, the pointer, passes beyond the 100% mark.

An incident to the comparative accuracy of the standard and the commercial meters is that the standard meter is designed to make two revolutions while the commercial meter makes five revolutions. By regulating the number of holes in the disc of the commercial meter, and the corresponding number of impulses per rotation, we may arrange to have the commercial meter make five revolutions between the making of the circuit (by pressing the button 36) and the breaking of the circuit by the arrival of the pointer at the separate contact 34. The same purpose can be accomplished by varying the number of steps of the movable contacts on the stationary contacts 29 and 32.

When the button is pressed, therefore, the movable contacts 28 and 31 proceed step by step, maintain the circuit through the standard meter for five revolutions of the test meter and then stop on the insulated contacts 33 and 34. If in those five revolutions of the commercial meter the standard meter indicator has made two revolutions, then the commercial meter is 100% accurate. If the standard meter has made less than two complete revolutions, then the commercial meter has moved faster than the standard meter and is fast by the percentage indicated on the scale; and if the standard meter has made more than two revolutions while the commercial meter was making five revolutions, then the commercial meter has not registered the same number of watt hours as the standard meter and is slower by the percentage indicated on the scale. Thus the indicator shows when it stops at the end of each test whether the commercial meter is too fast or too slow and shows the percentage of accuracy directly and determines the error plus or minus; in fact the apparatus rates the meter under test immediately and with perfect accuracy.

Figure 5:
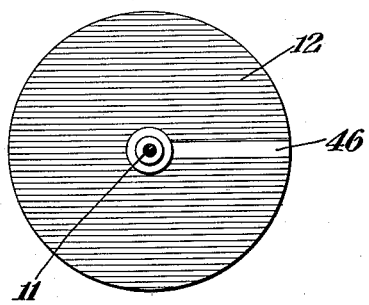
Figs. 5 and 6 are views similar to Figs. 3 and 4, illustrating a variant.
Figure 4:
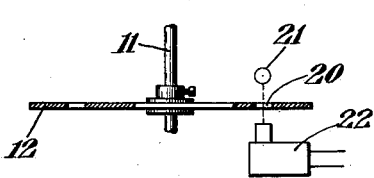
Fig. 4 is a vertical cross-section of the same with adjacent parts.
Figure 6:
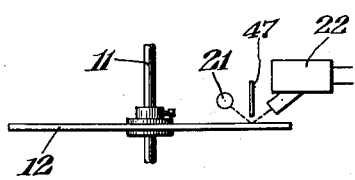

Various other schemes for making such tests by means of light rays may be used. In Fig. 5, for example, the disc 12 has a reflecting strip 46 on its face. The lamp 21 is arranged to throw a ray of light on the reflecting strip and back to the sensitive part of the light cell 22. A screen 47 is interposed between the cell and the lamp 21.

Figure 7:
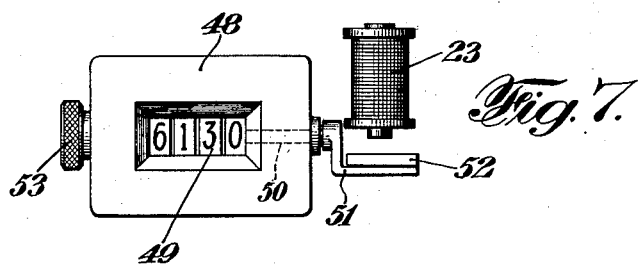
Figs. 7 and 8 are respectively a plan and a side elevation of a counter.
Figure 8:
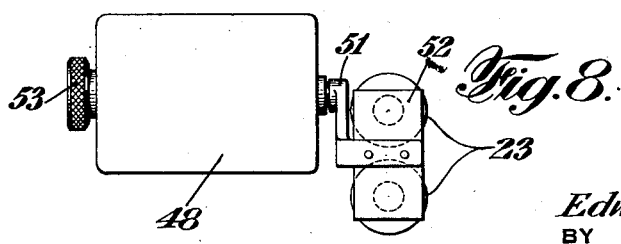

Instead of carrying the results to a percentage graduated scale, the device may be used merely to regulate a counter, such as is shown in Figs. 7 and 8. This may be a counter of ordinary commercial type having a casing 48 with an open face in which are exposed the edges of discs 49 which carry numerals and rotate so as to indicate units, tens and higher numbers.

The shaft 50 of the apparatus is moved step by step by means of a ratchet controlled by an arm 51 projecting from the end and carrying an armature 52 of the relay coil 23. A button 53, at one end, serves to reset the counter as desired.

The great advantage of this testing or counting device is that it operates without offering any resistance to the movement of the part which is being tested. Mechanical devices of all sorts for this class of work and devices which operate by directly making and breaking electrical contacts all impose a certain load on the apparatus.

In many apparatus a slight load of this sort is negligible. But for such delicate apparatus as electric meters particularly, it is very important to secure the desired rating without in any way interfering with the free operation of the apparatus. The only previously known way of doing this has been to count the revolutions by directly observing the passage of the holes in (or a mark on) the discs in a given period of time and observing the movement of a standard meter in the same period. This is not only laborious but subject to a certain inaccuracy dependent on the personal equation of the observer.

Fig. 9 illustrates a variation of Fig. 1. Instead of having the ray from the lamp 21 strike the cell 22 directly, the ray passes through the opening 20 in the disc and strikes a small mirror 54 which deflects it into the light-activated cell 22.

In commercial form, the apparatus may consist of the relay and the actuating and controlling devices described arranged to be properly connected to the commercial meter and standard meter. Or it may include the standard meter and appurtenances as well as the relay and connected parts adapted for direct application to commercial meters.

Various modifications in detail may be made by those skilled in the art without parting from the invention as defined in the following claims.

I claim:

1. A watt hour meter testing apparatus adapted to be applied to a commercial meter to be tested and to a standard meter and including means actuated by the commercial meter for operating the standard meter during a certain period of advance of the commercial meter.

2. A watt hour meter testing apparatus adapted to be applied to a commercial meter to be tested and to a standard meter and including means actuated by the commercial meter for operating the standard meter during a certain period of advance of the commercial meter and for indicating the advance of the standard meter during said period.

3. A watt hour meter testing apparatus adapted to be applied to a commercial meter to be tested and to a standard meter and including means for operating the standard meter during a certain period of advance of the commercial meter and for indicating the percentage of accuracy of the commercial meter compared with that of the standard meter.

4. A watt hour meter testing apparatus comprising a mechanism for operating a standard meter during a certain advance of said mechanism and light-activated means adapted to actuate said mechanism and to be operated by the movement of a meter to be tested.

5. A watt hour meter testing apparatus comprising a mechanism for operating a standard meter during a certain advance of said mechanism and light-activated means adapted to be operated by the movement of a meter to be tested and an indicator actuated by the standard meter to show the advance of the latter compared with the advance of the meter under test.

6. A testing apparatus of the character described including an indicating device, mechanism for actuating the indicating device during a certain predetermined and automatically limited advance of such mechanism, and light-activated means for advancing said mechanism in accordance with the movement of the apparatus to be tested.

In witness whereof, I have hereunto signed my name.

EDWARD E. HILL.